US012623672B2

(12) United States Patent
Neves et al.

(10) Patent No.: US 12,623,672 B2
(45) Date of Patent: May 12, 2026

(54) MONITORING SYSTEM FOR A VEHICLE CABIN

(71) Applicant: Volvo Car Corporation, Gothenburg (SE)

(72) Inventors: Danilo Neves, Gothenburg (SE); Egoi Sanchez Basualdo, Gothenburg (SE); Gunnar Ohlsson, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 244 days.

(21) Appl. No.: 17/838,697

(22) Filed: Jun. 13, 2022

(65) Prior Publication Data

US 2022/0402509 A1 Dec. 22, 2022

(30) Foreign Application Priority Data

Jun. 18, 2021 (EP) ..................................... 21180386

(51) Int. Cl.
| | |
|---|---|
| B60W 50/00 | (2006.01) |
| B60N 2/00 | (2006.01) |
| B60N 2/02 | (2006.01) |
| G01S 13/04 | (2006.01) |
| G01S 13/86 | (2006.01) |
(Continued)

(52) U.S. Cl.
CPC ....... B60W 50/0098 (2013.01); B60N 2/0021 (2023.08); B60N 2/0278 (2023.08); G01S 13/04 (2013.01); G01S 13/867 (2013.01); G06V 10/806 (2022.01); G06V 20/59 (2022.01); B60N 2210/20 (2023.08); B60N 2210/24 (2023.08);
(Continued)

(58) Field of Classification Search
None
See application file for complete search history.

(56) References Cited

U.S. PATENT DOCUMENTS

| | | | |
|---|---|---|---|
| 2009/0261979 A1 | 10/2009 | Breed et al. | |
| 2016/0176375 A1 | 6/2016 | Bolton et al. | |
(Continued)

FOREIGN PATENT DOCUMENTS

| | | | |
|---|---|---|---|
| CN | 104533222 A | | 4/2015 |
| CN | 107825945 A1 | | 3/2018 |
| KR | 20060039514 A | * | 5/2006 |

OTHER PUBLICATIONS

Machine translation of KR-20060039514-A (Year: 2006).*
(Continued)

*Primary Examiner* — Anne Marie Antonucci
*Assistant Examiner* — Kyle S Park
(74) *Attorney, Agent, or Firm* — Clements Bernard Walker; Christopher L. Bernard

(57) ABSTRACT

A monitoring system for a vehicle cabin, a vehicle including such a monitoring system and a method for monitoring a vehicle cabin. The monitoring system includes a first sensor unit, a second sensor unit and a control unit. The first sensor unit is configured to generate image data of the vehicle cabin. The second sensor unit is configured to generate non-image data of the vehicle cabin. The control unit is configured to collect the image data and the non-image data and determine based thereon whether an obstacle is in the vehicle cabin. The control unit is further configured to limit an actuation of a subsystem if the obstacle is disruptive for the actuation of the subsystem.

17 Claims, 3 Drawing Sheets

(51) Int. Cl.
    *G06V 10/80* (2022.01)
    *G06V 20/59* (2022.01)
(52) U.S. Cl.
    CPC . *B60W 2420/403* (2013.01); *B60W 2420/408* (2024.01)

(56) References Cited

U.S. PATENT DOCUMENTS

| | | | | |
|---|---|---|---|---|
| 2018/0022356 | A1* | 1/2018 | McBride | G01S 17/931 |
| | | | | 340/439 |
| 2021/0034888 | A1* | 2/2021 | Ye | G06T 5/94 |
| 2021/0117787 | A1* | 4/2021 | Stal | G06N 3/04 |
| 2021/0179117 | A1* | 6/2021 | Glazman | B60H 1/00357 |
| 2021/0295069 | A1* | 9/2021 | Toth | G05D 1/228 |
| 2024/0172946 | A1* | 5/2024 | Golombek | A61B 5/0022 |

OTHER PUBLICATIONS

Nov. 26, 2021 European Search Report issued in Corresponding EP Application No. 21180386.
Jun. 17, 2025 Office Action issued in corresponding CN Application No. 202210676316.7.

\* cited by examiner

MONITORING SYSTEM FOR A VEHICLE CABIN

CROSS-REFERENCE TO RELATED APPLICATION

The present disclosure claims the benefit of priority of co-pending European Patent Application No. 21 180 386.1, filed on Jun. 18, 2021, and entitled "Monitoring System for a Vehicle Cabin," the contents of which are incorporated in full by reference herein.

TECHNICAL FIELD

The present disclosure relates to a monitoring system for a vehicle cabin, a vehicle including such a monitoring system and a method for monitoring a vehicle cabin.

BACKGROUND

There are several detection systems, which monitor a presence of occupants or characteristics of an occupant at a specific location within a vehicle for safety reasons. For this purpose, the monitoring system applies various techniques such as imaging sensors, weight sensors, thermal sensors, etc. Based on output of the monitoring systems, an operation of subsystems, for instance seat adjustment, airbag deployment and/or window opening may be limited. However, the conventional detection systems are generally configured to individually control a designated subsystem.

SUMMARY

Hence, there may be a need to provide an improved monitoring system for a vehicle cabin, which may be connected to different sensors to allow an integrated monitoring and controlling of subsystems in the vehicle cabin.

The problem is at least partially solved or alleviated by the subject matter of the present disclosure. It should be noted that the aspects of the disclosure described in the following apply to the monitoring system for a vehicle cabin, the vehicle including such a monitoring system and the method for monitoring a vehicle cabin.

According to the present disclosure, a monitoring system for a vehicle cabin is presented. The monitoring system includes a first sensor unit, a second sensor unit and a control unit. The first sensor unit is configured to generate image data of the vehicle cabin. The second sensor unit is configured to generate non-image data of the vehicle cabin. The control unit is configured to collect the image data and the non-image data and determine based thereon whether an obstacle is in the vehicle cabin. The control unit is further configured to limit an actuation of a subsystem if the obstacle is disruptive for the actuation of the subsystem.

The monitoring system according to the present disclosure may provide an integrated control and actuation of a cabin configuration based on the position of occupants and/or objects. By processing the image data and the non-image data together, the monitoring system ensures higher accuracy, reliability and availability for operating subsystems in the vehicle cabin and avoiding potential strike, pinch and entrapment of occupants and/or objects by the subsystems in the vehicle cabin.

In the vehicle cabin, at least two sensor units may be arranged to monitor an interior environment and an interior configuration of the vehicle cabin. The first sensor unit and the second sensor unit may capture different kind of sensor data to collect reliable information of the vehicle cabin. The first sensor unit and the second sensor unit may generate time-synced data such that a real-time monitoring of the vehicle cabin is available. The first sensor unit may include one or more optical/vision sensors and collect data by capturing images of the vehicle cabin. The first sensor unit may be configured to provide spatial information of the vehicle cabin. However, quality of captured images may be influenced by weather conditions, increased sensor noise in sparsely lit areas and at night. Further, such a two-dimensional image may not provide distance information between the subsystem and obstacles.

The second sensor unit may supplement such weakness and produce non-image data by applying at least one non-image sensor such as microwave radiometers, magnetic sensors, gravimeters, radar and/or Lidar. The non-imaging sensor may measure radiation received from a sensed target. Hence, the second sensor unit may not be affected by environment conditions and capture reliable data even in sparse area of the image captured by the first sensor unit as well. By utilizing the first sensor unit and the second sensor unit together, precise spatial and dynamical data may be provided and a detection of the obstacle in the vehicle cabin may be enhanced. Thus, the control unit can perform an accurate decision.

The control unit may be an electronic control unit. The control unit may decide based on received data from the first sensor unit and the second sensor unit if an obstacle exists in the vehicle cabin. The obstacle may be one or more occupants and/or objects detected by at least one of first sensor unit and second sensor unit. The control unit may identify based on information of the obstacle such as position, size or the like, if the obstacle hinders an operation of one or more subsystems arranged inside the cabin vehicle.

Further, the control unit may disable or limit the actuation of at least one subsystem, if the obstacle is considered as dangerous to actuate the subsystem. If the control unit determines based on the collected data that the obstacle may be entrapped, struck and/or pinched by actuating or moving a specific subsystem, the control unit may allow the subsystem to execute only for a limited range or even reject the actuation of the subsystem to protect the obstacle.

Accordingly, the monitoring system may allow an accurate and safe operation of the subsystem in the vehicle cabin by integrally monitoring and controlling real-time situation of the vehicle cabin.

In an embodiment, the first sensor unit includes at least one optical image sensor. The first sensor unit may be configured to capture image data in the vehicle cabin. The optical image sensor may be a camera with a charge-coupled device (CCD) or an active-pixel sensor (CMOS) for converting light photons into electrical signals. The camera may include a wide field view lens such as a fisheye lens to acquire image data of entire area of the vehicle cabin and to detect visual obstructions in the vehicle cabin.

In an embodiment, the subsystem is a sunroof system, a window system, a seat adjustment system, a headrest system, a door system and/or an airbag system. The monitoring system may be configured to integrally control the subsystem arranged in the vehicle cabin. The subsystem may be electrically operated directly by the occupants. Hence, it is important to allow a safe operation of the subsystem to avoid strike, pinch and entrapment of the occupants and/or objects.

Accordingly, the monitoring system may verify and control the subsystem based on data generated by the first sensor unit and the second sensor unit. For instance, if the first sensor unit and the second sensor unit detect an occupied seat in the vehicle, the control unit may deny retracting headrest arranged in front of the occupied seat to avoid a strike of the headrest with the occupant. The monitoring system may also limit an actuation of the sunroof system if an oversized object is positioned on the seat system under the sunroof system. The monitoring system may disable or adjust deployment of an airbag system if a children car seat is mounted on the seat system. The monitoring system may further limit opening or closing of the window system or the door system, if a child is occupied on the seat system.

In an embodiment, the second sensor unit is configured to detect a reflected signal from the obstacle in the vehicle cabin. The second sensor unit including at least one non-image sensor may be configured to emit an energy source to the obstacle, which may be reflected, and to receive the reflected signal to obtain information about a position and/or speed of the obstacle.

In an embodiment, the second sensor unit may include a radar system. Data from the radar system may result from scanning of one or more regions of the vehicle cabin corresponding to one or more light-reflective features. Radio waves (pulsed or continuous) from a transmitter of the radar system may reflect off an object and return to a receiver, providing information about the object's location and speed. In particular, the radar system may provide an exact position of the object or the occupant by applying electromagnetic to calculate a distance of an object and position and detect a wide area, hence more than one objects simultaneously. Further, the second sensor unit may not be affected by environment conditions such as weather, daytime or the like. Accordingly, the second sensor unit may supplement the image data generated by the first sensor unit to allow the control unit to collect more reliable data.

In an embodiment, the first sensor unit is arranged in a longitudinal direction of the vehicle and/or the second sensor unit is arranged perpendicular to the longitudinal direction of the vehicle. The longitudinal direction may be a driving direction or a reverse driving direction of the vehicle. The first sensor unit may be mounted, for instance at a rearview mirror in the vehicle cabin to obtain a widest perspective of the vehicle cabin. Alternatively, the first sensor unit may be arranged at a tailgate of the vehicle in direction of the interior of the vehicle cabin. The specified sensors' positions of this disclosure are proposed for one specific application, but other positions may be also used for the sensors as long as they enable sufficient detection data based on the sensors' specification, scanning pattern and field of view. Therefore, the sensors may be arranged differently depending on a technology capability and needs considering a vehicle design.

To complement the captured image data by the first sensor unit, the second sensor unit may be arranged in a lateral direction of the vehicle, which may be perpendicular to the driving direction of the vehicle. Preferably, the second sensor unit may include a plurality of non-image sensors to detect substantially entire interior of the vehicle cabin, such as a space between a front seat and a rear seat and/or a rear door area. The plurality of non-image sensors may be arranged on a roof. Additionally or alternatively, the plurality of non-image sensors may be arranged at an a-pillar, a b-pillar and/or a c-pillar. Accordingly, the control unit may receive authentic information about a current situation of the vehicle cabin.

In an embodiment, the monitoring system further includes a third sensor unit including one or more subsystem sensors. The third sensor unit is configured to send operating data of the subsystem to the control unit. In addition to the image data collected by the first sensor unit and the non-image data collected by the second sensor unit, further sensor data from the subsystem may be sent and processed in the control unit to provide more reliable and safe actuation of the subsystem.

In an embodiment, the control unit is configured to fuse data collected from the first sensor unit, the second sensor unit and/or third sensor unit and to determine a position of the obstacle. The control unit may merge the two dimensional image data from the first sensor unit and the dynamic non-image data from the second sensor unit to create a 3-D point map. The 3-D point map, in other words 3-D point cloud may provide an accurate spatial information of the vehicle cabin.

In an embodiment, the data collected from the first sensor unit, the second sensor unit and/or third sensor unit is raw data. In an embodiment, the data collected from the first sensor unit, the second sensor unit and/or third sensor unit is feature extraction data. In an embodiment, the data collected from the first sensor unit, the second sensor unit and/or third sensor unit is inference data.

The level of the collected sensor data may be defined with respect to a level of data processing. Accordingly, the raw data may be original data captured by the respective sensor unit. The feature extraction data may be pre-processed data, with which the respective sensor unit may identify one or more features. The inference data may be data evaluated and predicted for a character determination of the detected features. The control unit may be configured to automatically learn at which level the fusion of the sensor data is most beneficial for a detection result. In the control unit, a training strategy may be implemented, which focuses the learning on a specific sensor type.

Accordingly, the control unit may be configured to perform a data fusion, in which the raw data from the first sensor unit, the second sensor unit and/or third sensor unit are merged. The control unit may also be configured to perform a feature fusion, in which features are initially extracted from sensor data. Further, the control unit may perform a decision fusion, in which a final decision can be made based on feature inference data generated by the first sensor unit, the second sensor unit and/or third sensor unit for determining a precise position of the obstacle.

In an embodiment, the control unit is configured to determine whether the position of the obstacle in the vehicle cabin is disruptive for the actuation of the subsystem. After identifying and confirming an obstacle and its position in the vehicle cabin, the control unit may further assess, whether the obstacle may at least partially or entirely block the actuation of the subsystem. In case the obstacle is determined to be disruptive for the operation of the subsystem, the control unit may warn the occupant and limit or disable the operation of the subsystem. Accordingly, the monitoring system enable a higher safety integrity for the subsystem, which may be movable in the vehicle cabin.

In an embodiment, the control unit is configured to initiate scanning the vehicle cabin by the first sensor unit, the second sensor unit and/or third sensor unit based on a command for the operation of the subsystem. The control unit may prompt the first sensor unit, the second sensor unit and/or third sensor unit to generate data for determining the obstacle, when the control unit receives a signal to actuate the subsystem. The signal may be an input of the occupant and/or any inevitable command of the control unit depending on a driving situation such as vehicle collision.

In an embodiment, the control unit is configured to allow the actuation of the subsystem if the obstacle is removed or if being relocated to a safe position in relation to the subsystem operation. The control unit may continuously monitor after a rejection of the operation of the subsystem, if a potential risk is overcome to enable a desired operation of the subsystem. It is also possible that the obstacle may be moved after the control system warns about the disruptive obstacle such that the occupants may relocate the obstacle for enabling the actuation of the subsystem.

According to the present disclosure, a vehicle is presented. The vehicle includes a monitoring system as described above. Hence, the vehicle may have a higher safety integrity of the subsystem in the vehicle cabin.

According to the present disclosure, a method for monitoring a vehicle cabin is presented. The method includes, not necessarily in this order:

- generating image data of the vehicle cabin by a first sensor unit,
- generating non-image data of the vehicle cabin by a second sensor unit,
- collecting the image data and the non-image data and determining based thereon whether an obstacle is in the vehicle cabin, and
- limiting an actuation of a subsystem if the obstacle is disruptive for the actuation of the subsystem.

It should be noted that the above embodiments may be combined with each other irrespective of the aspect involved. Accordingly, the method may be combined with structural features and, likewise, the system may be combined with features described above with regard to the method.

These and other aspects of the present embodiments will become apparent from and elucidated with reference to the embodiments described hereinafter.

BRIEF DESCRIPTION OF THE DRAWINGS

Exemplary embodiments will be described in the following with reference to the following drawings.

DESCRIPTION OF EMBODIMENTS

Figure 1:
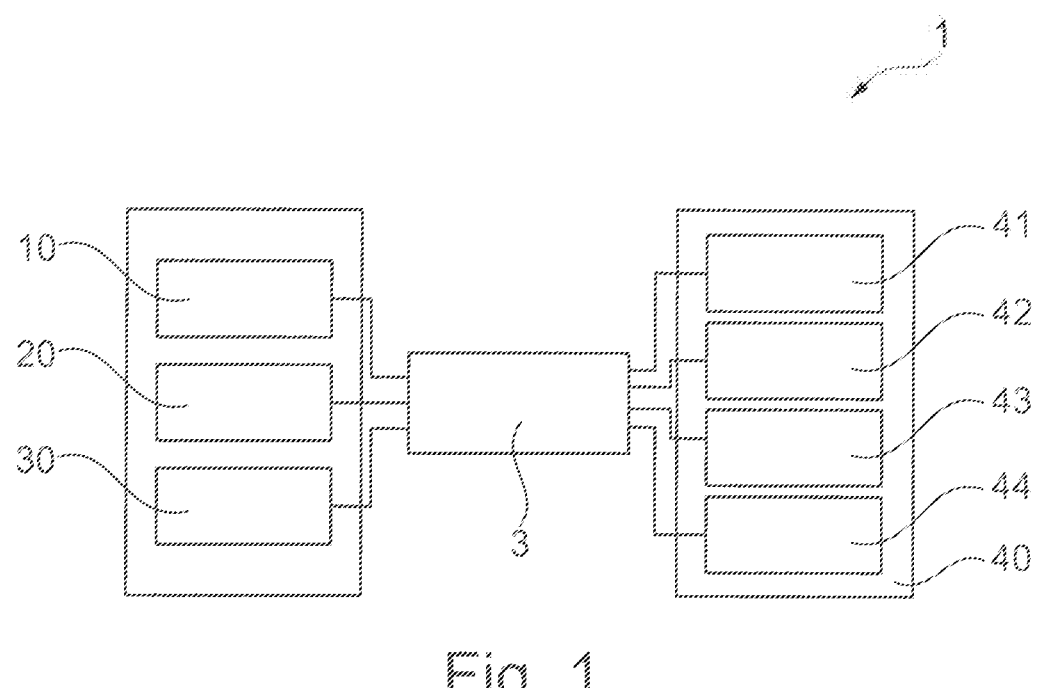
FIG. 1 shows schematically and exemplarily an embodiment of a monitoring system according to the present disclosure.

FIG. 1 shows a monitoring system 1, which is integrated in a vehicle 100 for monitoring a vehicle cabin 2. The monitoring system 1 includes a first sensor unit 10 and a second sensor unit 20. The first sensor unit 10 is configured to generate image data of the vehicle cabin 2. The first sensor unit 10 may be a camera including at least one optical image sensor and a wide field view lens such as a fisheye lens to acquire image data of entire area of the vehicle cabin 2 and to detect visual obstructions in the vehicle cabin 2. The second sensor unit 20 is configured to generate non-image data of the vehicle cabin 2. The second sensor unit 20 is configured to detect a reflected signal from the obstacle in the vehicle cabin 2. The second sensor unit 20 may be a radar system.

Figure 2:
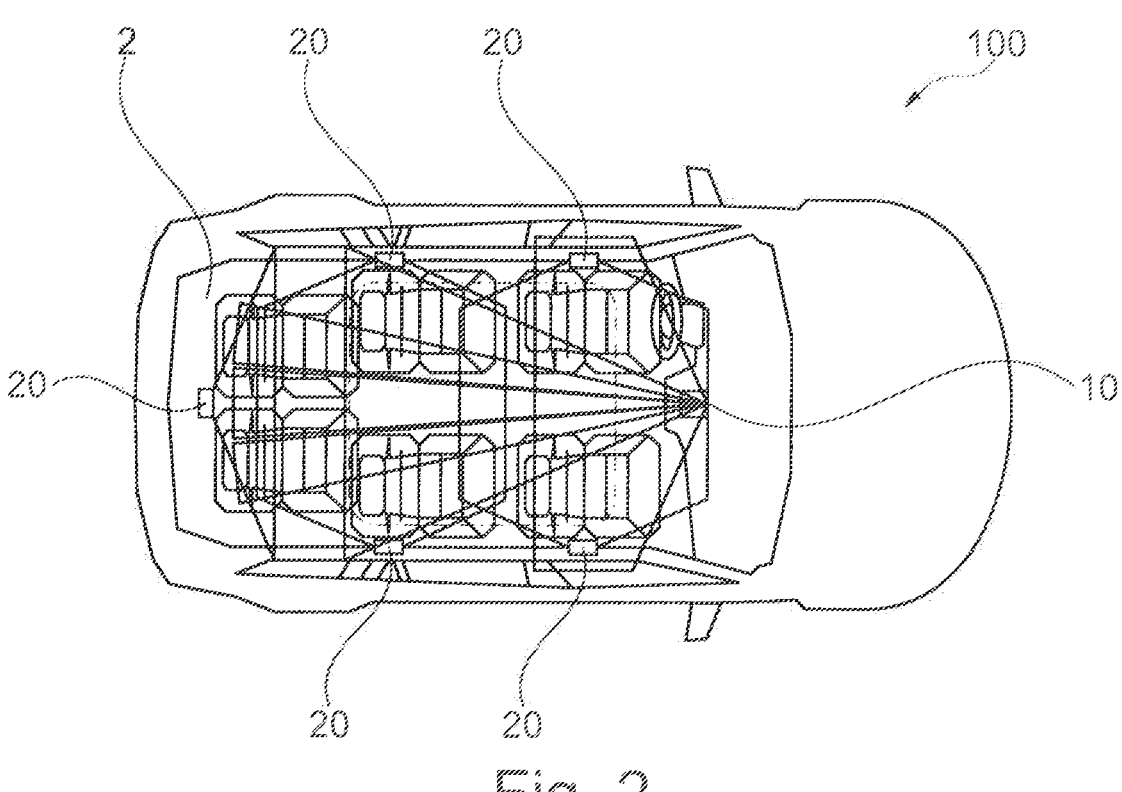
FIG. 2, FIG. 3 show schematically and exemplarily an embodiment of a detected area by a first sensor unit and a second sensor unit of a monitoring system according to the present disclosure.
Figure 3:
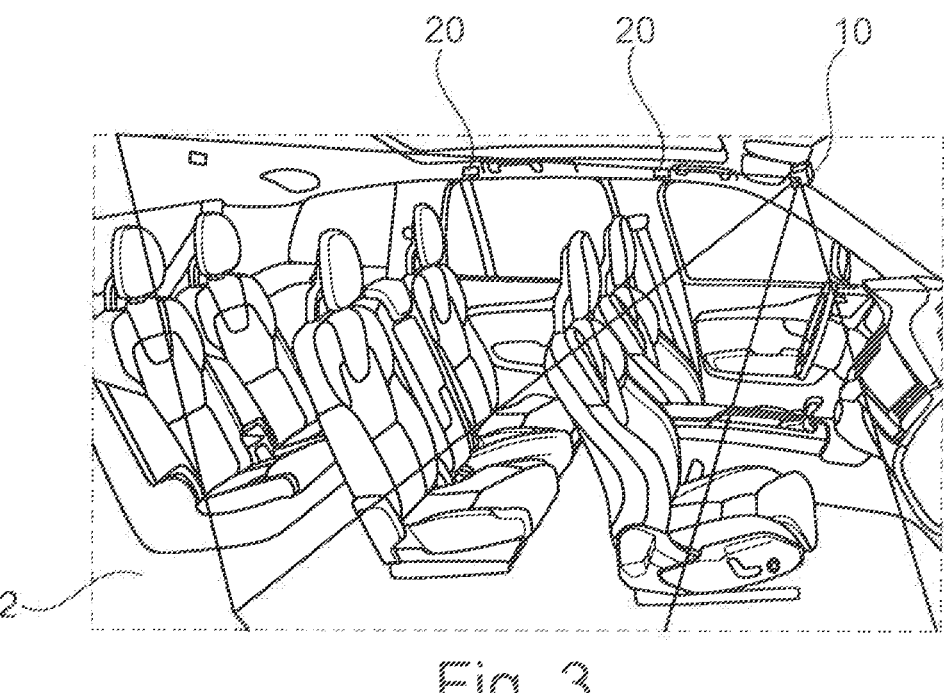

As shown in FIG. 2, the first sensor unit 10 is mounted in a longitudinal direction of the vehicle 100 and a plurality of sensor elements of the second sensor unit 20 are arranged in a lateral direction, i.e. perpendicular to the driving direction of the vehicle. As shown in FIG. 3 substantially entire area of the vehicle cabin 2 may be detected the first sensor unit 10 and the second sensor unit 20 to provide reliable information on vehicle cabin 2.

Figure 4:
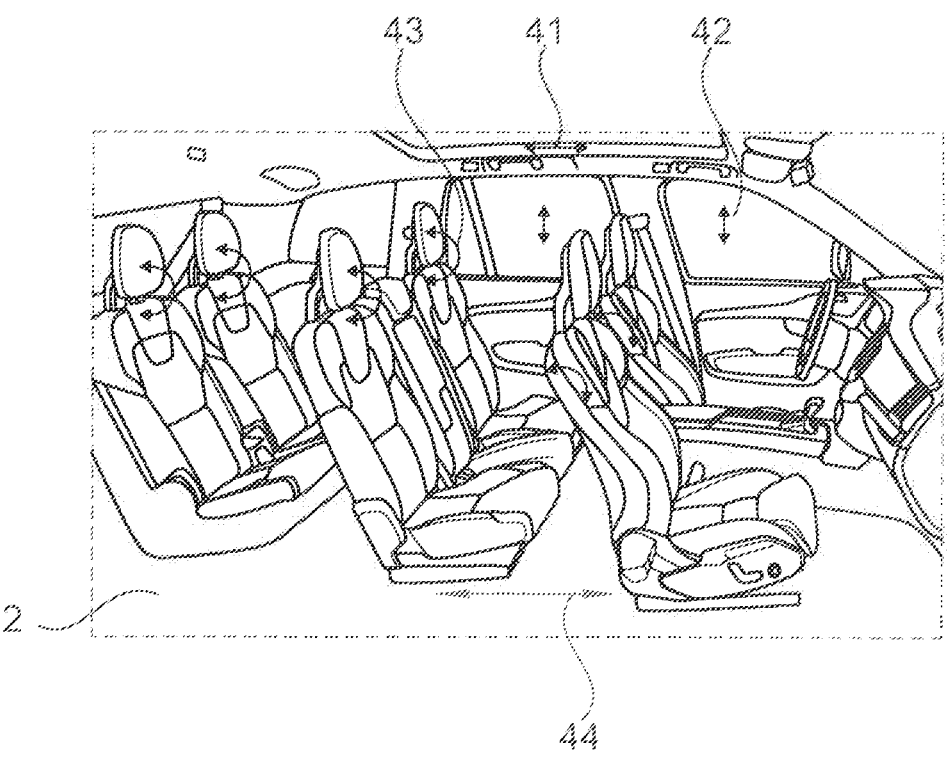
FIG. 4 shows schematically and exemplarily an embodiment of subsystems according to the present disclosure.

The monitoring system 1 further includes a third sensor unit 30 including one or more subsystem sensors. The third sensor unit 30 is configured to send operating data of the subsystem 40 to a control unit 3. The subsystem 40 is for instance a sunroof system 41, a window system 42, a head-rest system 43, a seat adjustment system 44, a door system and/or an airbag system (see FIG. 4).

The control unit 3 is configured to collect the image data and the non-image data from the first second and/or third sensor unit 10, 20, 30 and to determine, whether an obstacle is in the vehicle cabin 2. The obstacle may one or more occupants and/or objects positioned in the vehicle cabin 2. The control unit 3 initiates scanning the vehicle cabin 2 by the first sensor unit 10, the second sensor unit 20 and/or third sensor unit 30 based on a command for an actuation of the subsystem 40. The command may be an input of the occupant and/or any inevitable command of the control unit depending on a driving situation such as vehicle collision.

The control unit 3 is further configured to fuse data collected for determining a position of the obstacle. The level of collected data may be defined with respect to a level of data processing. The collected data may be raw data, feature extraction data and/or inference data. The control unit 3 may be configured to automatically learn at which level a data fusion is most beneficial for a detection result. In the control unit 3, a training strategy may be implemented, which focuses the learning on a specific sensor type.

The control unit 3 determines based on the data collected from the first sensor unit 10, the second sensor unit 20 and/or third sensor unit 30, whether the position of the obstacle in the vehicle cabin 2 is disruptive for the actuation of the subsystem 40. If the obstacle is determined as disruptive for the actuation of the subsystem 40, the control unit 3 limits or disables the actuation of the subsystem 40. The control the control unit 3 allows the actuation of the subsystem 40 if the obstacle is removed.

Figure 5:
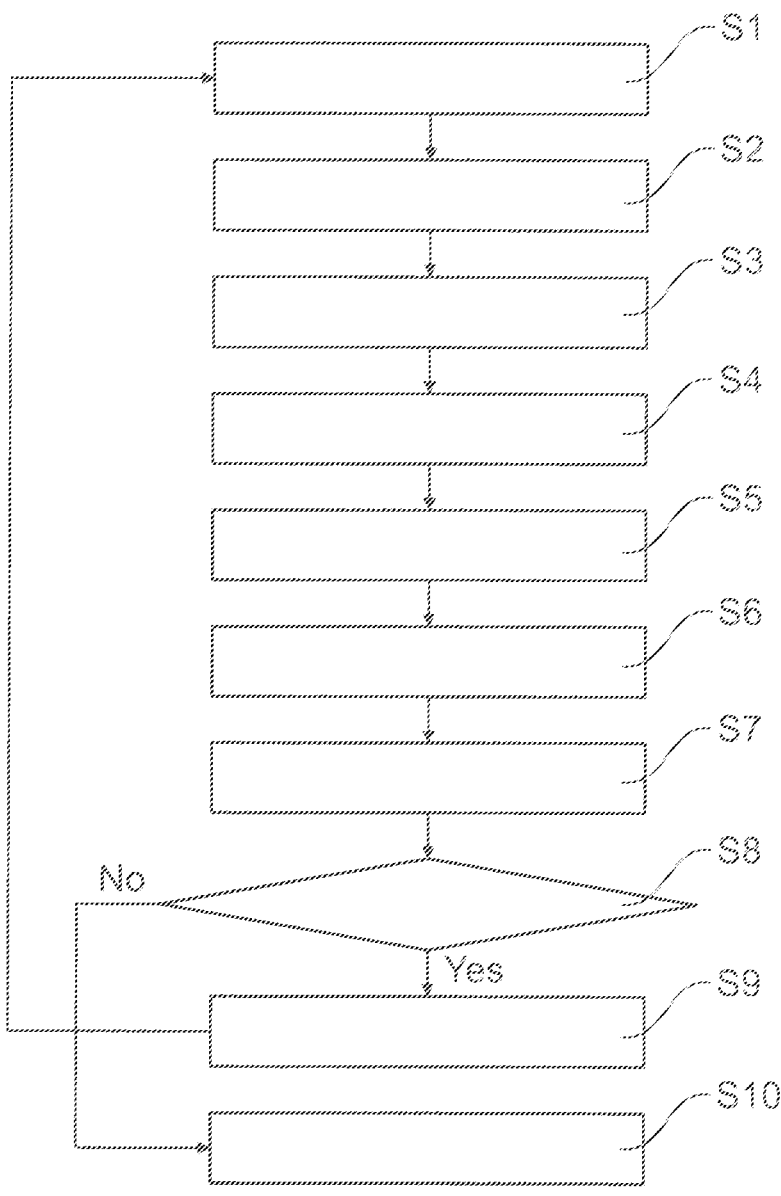
FIG. 5 shows schematically and exemplarily a method for monitoring a cabin vehicle according to the present disclosure.

FIG. 5 shows schematically the method for monitoring the vehicle cabin 2. The method includes:

- S0 a subsystem 40 in an inactive mode,
- S1 receiving a command for an actuation of the subsystem 40,
- S2 initiating scanning the vehicle cabin 2 by the first sensor unit 10, the second sensor unit 20 and/or third sensor unit 30 based on the command for the actuation of the subsystem 40,
- S3 generating image data of the vehicle cabin 2 by a first sensor unit 10,
- S4 generating non-visible data of the vehicle cabin 2 by a second sensor unit 20,
- S5 collecting the image data and the non-visible data and determining based thereon whether an obstacle is in the vehicle cabin 2,
- S6 collecting operating data of the subsystem 40 by a third sensor unit 30,
- S7 determining a position of an obstacle by fusing data collected from the first sensor unit 10, the second sensor unit 20 and/or third sensor unit 30,

S8 determining whether the position of the obstacle in the vehicle cabin 2 is disruptive for an actuation of the subsystem 40, S9 limiting the actuation of the subsystem 40 if the obstacle is disruptive for the actuation of the subsystem 40, and S10 allowing the actuation of the subsystem 40 if the obstacle is removed.

It has to be noted that embodiments of the disclosure are described with reference to different subject matter. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matter is considered to be disclosed with this application. However, all features can be combined providing synergetic effects that are more than the simple summation of the features.

While the disclosure has been illustrated and described in detail in the drawings and description, such illustration and description are to be considered illustrative or exemplary and not restrictive. The disclosure is not limited to the disclosed embodiments. Other variations to the disclosed embodiments can be understood and effected by those skilled in the art in practicing a claimed disclosure, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items re-cited in the claims. The mere fact that certain measures are recited in mutually different dependent claims does not indicate that a combination of these measures cannot be used to advantage. Any reference signs in the claims should not be construed as limiting the scope.

The invention claimed is:

1. A monitoring system for a vehicle cabin, the monitoring system comprising:

a first sensor unit, a second sensor unit, and a control unit, the first sensor unit being arranged in a longitudinal direction of a vehicle and being configured to generate image data of the vehicle cabin, the second sensor unit being arranged perpendicular to a driving direction of the vehicle and being configured to generate non-image data of the vehicle cabin, the control unit being coupled to a plurality of subsystems and configured to initiate scanning the vehicle cabin by the first sensor unit and/or the second sensor unit based on a command for actuation of a subsystem of the plurality of subsystems, the control unit being further configured to collect and fuse a determined level of the image data and the non-image data after scanning is initiated and determine based thereon whether an obstacle is in the vehicle cabin, the control unit being further configured to determine what level of the image data and the non-image data to fuse with respect to a degree of processing that has been done to the image data and the non-image data, being raw data, feature extraction data, or inference data, based on training for sensor type and detection result, and the control unit being further configured to limit the actuation of the subsystem if the obstacle is disruptive for the actuation of the subsystem.

2. The monitoring system according to claim 1, the first sensor unit comprising at least one optical image sensor.

3. The monitoring system according to claim 1, the plurality of subsystems being multiple of a sunroof system, a window system, a headrest system, a seat adjustment system, a door system and/or an airbag system.

4. The monitoring system according to claim 1, the second sensor unit being configured to detect a reflected signal from the obstacle in the vehicle cabin.

5. The monitoring system according to claim 1, further comprising a third sensor unit including one or more dedicated subsystem sensors, the third sensor unit being configured to send operating data of the subsystem to the control unit.

6. The monitoring system according to claim 5, the control unit being configured to fuse data collected from the first sensor unit, the second sensor unit and the third sensor unit and to determine a position of the obstacle.

7. The monitoring system according to claim 6, the data collected from the first sensor unit, the second sensor unit and the third sensor unit being the raw data.

8. The monitoring system according to claim 6, the data collected from the first sensor unit, the second sensor unit and the third sensor unit being the feature extraction data.

9. The monitoring system according to claim 6, the data collected from the first sensor unit, the second sensor unit and the third sensor unit being the inference data.

10. The monitoring system according to claim 6, the control unit being configured to determine whether the position of the obstacle in the vehicle cabin is disruptive for the actuation of the subsystem.

11. The monitoring system according claim 10, the control unit being configured to initiate scanning the vehicle cabin by the third sensor unit based on the command for the actuation of the subsystem.

12. The monitoring system according to claim 11, the control unit being configured to continue scanning the vehicle cabin by the first sensor unit and/or the second sensor unit after limiting the actuation of the subsystem and allow the actuation of the subsystem if the obstacle is removed responsive to warning an occupant that the obstacle is disruptive for the actuation of the subsystem.

13. The monitoring system according to claim 1, wherein initiating scanning the vehicle cabin by the first sensor unit and/or the second sensor unit comprises prompting the first sensor unit and/or the second sensor unit to activate and begin generating the respective image data and/or non-image data.

14. The monitoring system according to claim 1, wherein the command for the actuation of the subsystem that causes the control unit to initiate scanning the vehicle cabin by the first sensor unit and/or the second sensor unit is a received input from an occupant for the actuation of the subsystem.

15. The monitoring system according to claim 1, wherein the command for the actuation of the subsystem that causes the control unit to initiate scanning the vehicle cabin by the first sensor unit and/or the second sensor unit is a received input from the vehicle for the actuation of the subsystem responsive to a driving situation of the vehicle.

16. A vehicle, comprising:

a vehicle cabin, and a monitoring system for the vehicle cabin, the monitoring system comprising:

a first sensor unit, a second sensor unit, and a control unit, the first sensor unit being arranged in a longitudinal direction of the vehicle and being configured to generate image data of the vehicle cabin, the second sensor unit being arranged perpendicular to a driving direction of the vehicle and being configured to generate non-image data of the vehicle cabin, the control unit being coupled to a plurality of subsystems and configured to initiate scanning the vehicle cabin by the first sensor unit and/or the second sensor unit based on a command for actuation of a subsystem of the plurality of subsystems, the control unit being further configured to collect and fuse a determined level of the image data and the non-image data after scanning is initiated and determine based thereon whether an obstacle is in the vehicle cabin, the control unit being further configured to determine what level of the image data and the non-image data to fuse with respect to a degree of processing that has been done to the image data and the non-image data, being raw data, feature extraction data, or inference data, based on training for sensor type and detection result, and the control unit being further configured to limit the actuation of the subsystem if the obstacle is disruptive for the actuation of the subsystem.

17. A method for monitoring a vehicle cabin, the method comprising:

generating image data of the vehicle cabin by a first sensor unit being arranged in a longitudinal direction of a vehicle, generating non-image data of the vehicle cabin by a second sensor unit being arranged perpendicular to a driving direction of the vehicle, initiating scanning the vehicle cabin by the first sensor unit and/or the second sensor unit at the direction of a control unit coupled to a plurality of subsystems based on a command for actuation of a subsystem of the plurality of subsystems, determining what level of the image data and the non-image data to fuse with respect to a degree of processing that has been done to the image data and the non-image data, being raw data, feature extraction data, or inference data, based on training for sensor type and detection result, collecting and fusing the determined level of the image data and the non-image data after scanning is initiated and determining based thereon whether an obstacle is in the vehicle cabin, and limiting the actuation of the subsystem if the obstacle is disruptive for the actuation of the subsystem.

* * * * *